United States Patent [19]
Abe

[11] Patent Number: 6,081,245
[45] Date of Patent: Jun. 27, 2000

[54] PLASMA-ADDRESSED LIQUID CRYSTAL DISPLAY DEVICE

[75] Inventor: Hironobu Abe, Kanagawa, Japan

[73] Assignee: Sony Corporation, Tokyo, Japan

[21] Appl. No.: 08/242,235

[22] Filed: May 13, 1994

[30] Foreign Application Priority Data

May 18, 1993 [JP] Japan ..................................... 5-139584

[51] Int. Cl.[7] .................................................. G09G 3/28
[52] U.S. Cl. ................................................ 345/60; 345/66
[58] Field of Search .................................. 345/60, 87, 93, 345/66; 359/54

[56] References Cited

U.S. PATENT DOCUMENTS

| | | | |
|---|---|---|---|
| 4,896,149 | 1/1990 | Buzak et al. ............................... | 345/60 |
| 5,077,553 | 12/1991 | Buzak ....................................... | 345/60 |
| 5,313,223 | 5/1994 | Buzak et al. ............................... | 345/60 |
| 5,349,454 | 9/1994 | Iwama ....................................... | 345/87 |
| 5,361,080 | 11/1994 | Kwon ........................................ | 345/87 |

*Primary Examiner*—Regina Liang
*Attorney, Agent, or Firm*—Hill & Simpson

[57] ABSTRACT

A plasma-addressed liquid crystal display device owns a flat panel structure such that a liquid crystal cell and a plasma cell are stacked to each other via an intermediate glass thin plate. The liquid crystal cell is equipped with a column-shaped data electrode and a liquid crystal layer. The plasma cell is equipped with a discharge channel constituted by one pair of an anode electrode and a cathode electrode. A scanning circuit is connected to the plasma cell to apply strobe pulses to the respective discharge channels in a row scan operation. A drive circuit is connected to the liquid crystal cell to apply a drive voltage to the data electrode D in synchronism with this row scan operation. The drive circuit includes a control means for controlling an application of a drive voltage in correspondence with the application timing of the strobe pulse, thereby suppressing an occurrence of unfavorable localized discharge. This control means is arranged by a level shifter to lower the drive voltage in a time period during the strobe pulse is applied.

5 Claims, 8 Drawing Sheets

PLASMA-ADDRESSED LIQUID CRYSTAL DISPLAY DEVICE

BACKGROUND OF THE INVENTION

The present invention relates to a plasma-addressed liquid crystal display device. More specifically, the present invention is directed to a method for driving the plasma-addressed liquid crystal display device.

Plasma-addressed liquid crystal display devices are disclosed in, for example, U.S. Pat. No. 4,896,149 and U.S. Pat. No. 5,077,553 which correspond to Japanese Published Unexamined (Kokai) Patent Application No. 1-217396, or Japanese Published Unexamined (Kokai) Patent Application No. 4-265931 which corresponds to U.S. patent application Ser. No. 07/837,961 assigned to the assignee of the present application. A plasma-addressed liquid crystal display device has a flat panel structure such that a liquid crystal cell having a column-shaped data electrode and a plasma cell having a row-shaped display channel are mutually stacked via an intermedium glass thin plate. The plasma cell provided at the lower side is employed so as to address the liquid crystal cell provided at the upper side. That is, a scanning circuit is connected to the plasma cell to apply data pulses to the respective discharge channels in the row scan operation. Each of the display channels contains one pair of an anode electrode and a cathode electrode. On the other hand, a drive circuit is connected to the liquid crystal cell so as to apply drive voltages to the data electrodes in synchronism with the above-described row scan operation.

Subsequently, operations of the plasma-addressed liquid crystal display device will now be explained. The drive voltages (data voltages) whose polarity has been inverted with respect to that of the anode potential, are applied to the data electrodes of the liquid crystal cell which consitute the column lines (vertical lines) for every 1 frame, or 1 line of the image display. On the other hand, plasma discharge is produced in the row scanning manner at the display channels which constitude the row lines (horizontal lines). As a result, a potential substantially equal to that of the anode electrode is at the lower surface of the intermediate glass thin plate during the discharge operatt, or just after the completion of the discharge operation. During this potential production, a potential difference is produced between the data electrode and the lower surface of the glass thin plate, orientation of the liquid crystal molecule direction is varied in accordance with the effective value of this potential difference, and an amount of light passing through the liquid crystal cell is changed. This effective value is such a value obtained by subdividing the potential difference in accordance with the ratio of a liquid crystal capacity to a glass thin-plate capacity. As a consequence, it is possible to control the transmittance of light passing through the liquid crystal cell in response to a difference between the potential applied to the data electrode and the anode potential. The potential difference between the signal electrode and the lower surface of the glass thin plate is maintained until the plasma discharge is produced in the next frame unless the electrons leak from the liquid crystal cell, the intermediate glass thin plate, and the like, and thus the liquid crystal cell keeps its transmittance.

To the contrary, the potential at the lower surface of the glass thin plate under non discharging conditions continuously follows the voltage applied to the data electrode of the liquid crystal cell. In case that the potential at the data electrode is relatively high, the potential at the lower surface becomes relatively higher than that at the anode electrode in correspondence with the higher potential at the data electrode. When the discharge pulse is applied to the cathode electrode so as to generate plasma discharge, there is a risk that an unfavorable localized discharge is produced. Originally, normal discharge should be produced between the anode electrode and the cathode electrode. However, such an unfavorable localized discharge would be generated between the lower surface of the glass thin plate, whose potential is higher than that of the anode electrode, and the cathode electrode, resulting in a short circuit condition between the lower surface of the glass thin plate and the cathode electrode. Accordingly, the potential at the lower surface of the glass thin plate is instantaneously decreased to the cathode potential. As a consequence, the voltage between the anode electrode and the cathode electrode is superimposed with the potential difference between the data electrode and the glass thin plate, so that the excessive DC voltage would be applied to the liquid crystal cell. When such an excessive DC voltage would be applied to the liquid crystal cell, a so-called "image retention" happens to occur. As a consequence, for instance, in the normally white mode representation, black color is kept written, which may cause a problem that the normal representation is impeded. Furthermore, the application of such an excessive DC voltage to the liquid crystal cell does not constitute proper conditions in view of lifetime and display qualities of the liquid crystal cell, which should be solved.

SUMMARY OF THE INVENTION

To solve the above-described technical problems of the prior art, the following means have been made. That is, a plasma-addressed liquid crystal display apparatus, according to the present invention, basically comprises a flat panel structure such that a liquid crystal cell having a column-shape data electrode and a plasma cell having a row-shaped discharge channel are mutually stacked to each other. A scanning circuit is connected to the plasma cell thereby to apply strobe pulses to the respective discharge channels under the row scan operation. Also, a drive circuit is connected to the liquid cell thereby to apply a drive voltage to the data electrode in synchronism with the selection of this row scan operation.

In accordance with the featured item of the present invention, the above-described drive circuit is equipped with a control means for controlling the application of the drive voltage in response to the application timing of the strobe pulse, thereby suppressing generations of unfavorable localized discharge. More specifically, this control means decreases the drive voltage in a period during which the strobe pulse is applied. Alternatively, the control means may set the data electrode to a floating potential in the period during which the strobe pulse is applied. Otherwise, the control means may apply the drive voltage just after the application of the strobe pulse is ended.

According to the present invention, it is so designed that the drive voltage to be applied to the liquid crystal cell is lowered at a time instant when the strobe pulse is applied to the cathode electrode so as to generate the plasma discharge. As a consequence, probabilities of the generation of the unfavorable localized discharge between the cathode electrode and the liquid crystal cell could be suppressed, so that normal discharge can be produced between the anode electrode and the cathode electrode, and at the same time, the high drive voltage required to drive the liquid crystal cell can be applied.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENTS

Figure 5:
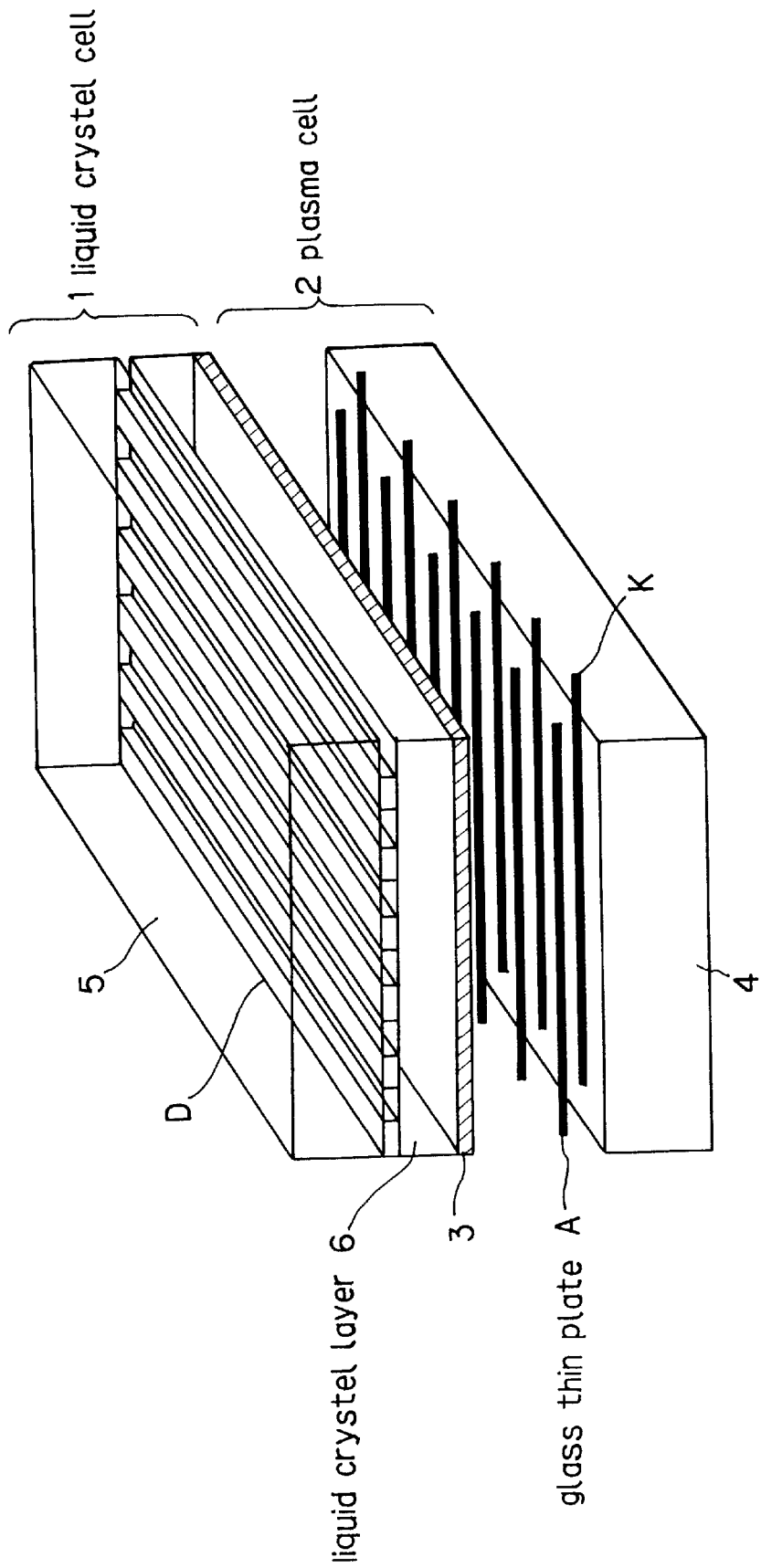
FIG. 5 is a perspective view of a general structure of a plasma-addressed liquid crystal display device.

Before describing various preferred embodiments of the present invention, a general structure of a plasma-addressed liquid crystal display device will now be explained with reference to FIG. 5. As illustrated in this drawing, the plasma-addressed liquid crystal display device has a flat panel structure constructed of a liquid crystal cell 1, a plasma cell 2 and a glass thin plate 3 interposed between the liquid crystal cell 1 and the plasma cell 2. The plasma cell 2 is formed by utilizing a glass substate 4 positioned at a lower side thereof. A plurality of parallel discharge channels are provided on a surface of this plasma cell 2. This discharge channel is extended along, for instance, a column direction of a matrix. A space between the glass thin plate 3 and the lower-sided glass substrate 4 is sealed. An ionizable gass is filled within this sealed space. Each of the discharge channels is constructed by one pair of an anode electrode "A" and a cathode electrode "K", which are positioned in parallel to each other. This pair of the anode electrode "A" and the cathode "K" produces plasma discharge by ionizing the gas sealed in the space. These discharge channels are scanned in row by row.

On the other hand, the liquid crystal cell 1 is arranged by employing another glass substrate 5 positioned at an upper side thereof. This glass substrate 5 is arranged opposite to the intermediate glass thin plate 3 via a predetermined space into which a liquid crystal layer 6 is filled. Also, a data electrode D constructed of a transparent conductive film (ITO etc.) is formed on an inner surface of the upper-sided glass substrate 5. This data electrode D is positioned perpendicular to the discharge channel in unit of column signal. A matrix-shaped pixel is defined at an intersection between the unit of column signal and the unit of row signal.

Figure 6:
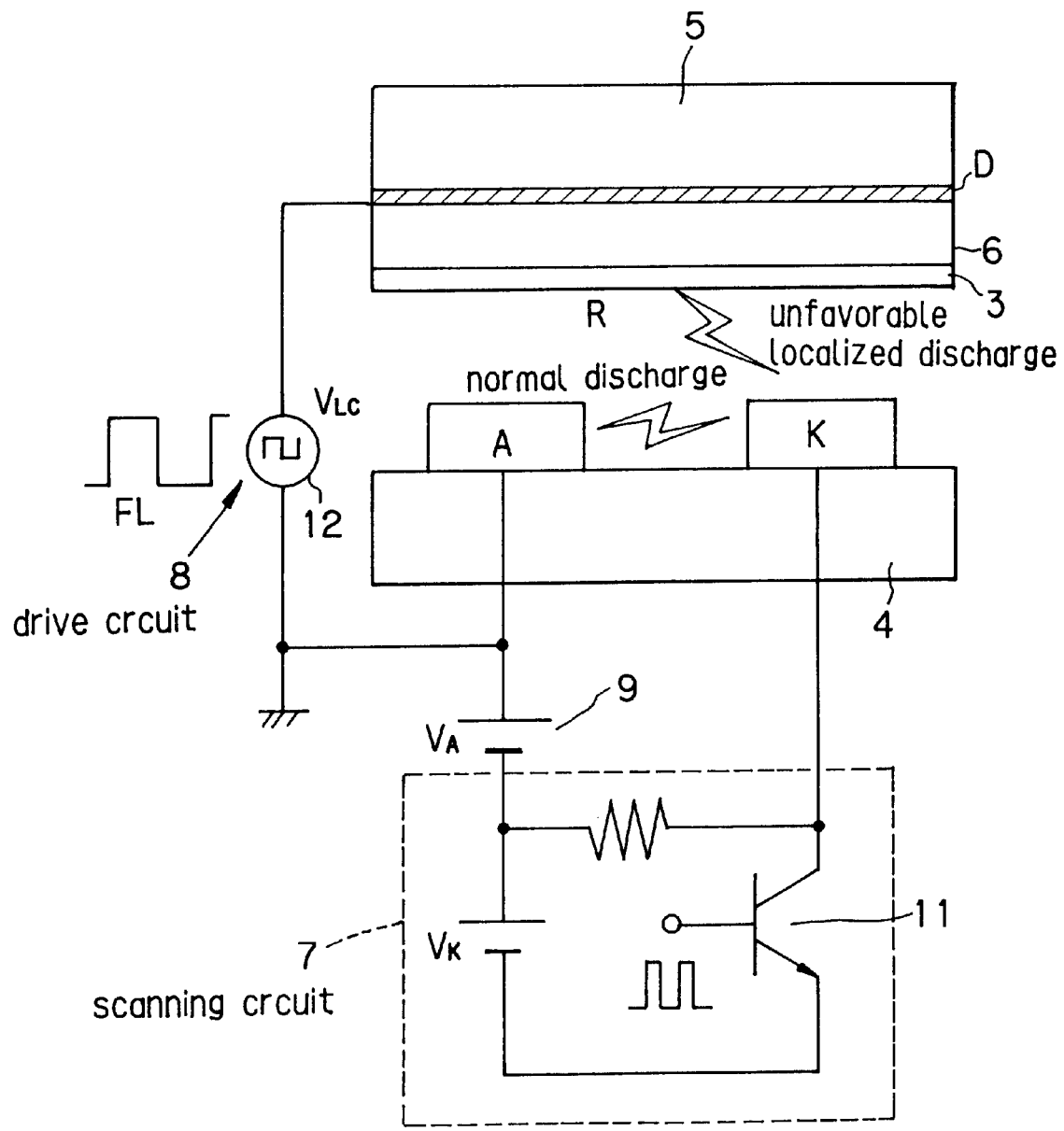
FIG. 6 schematically represents a general structure of a plasma-addressed liquid crystal display device.

FIG. 6 schematically shows a portion of one pixel cut out from the above-described general structure of the plasma-addressed liquid crystal display device, and also shows a relevant circuit arrangement. This circuit arrangement includes a scanning circuit 7 and a drive circuit 8. The scanning circuit 7 applies strobe pulses to the respective discharge channels in accordance with the row scan operation. The scanning circuit 7 is equipped with a first DC power source 9 connected to the anode electrode A, which supplies a predetermined anode voltage $V_A$ to this anode electrode A. A second DC power source 10 is series-connected to the first DC power source 9, which supplies a predetermined cathode amplitude voltage $V_K$ to the cathode electrode K. A switching element 11 is interposed between this second DC power source 10 and the cathode electrode K which applies the strobe pulses to the cathode electrode K in synchronism with a predetermined clock signal CLK. The clock signal CLK is synchronized with the horizontal synchronization (sync) signal which may define the above-described row-scan-operation selection timing. On the other hand, the drive circuit 8 applies a drive voltage $V_{LC}$ to the data electrode D in synchronism with this row-scan-operation selection timing. To this end, a signal source 12 is provided which is connected between the anode electrode A and each of the signal electrodes D. The signal source 12 applies the drive voltage $V_{LC}$ to the data electrode D, the polarity of which has been inverted for every frame or every 1 line with respect to the anode potential (ground potential). This polarity inversion is controlled by a frame signal FL in correspondence with the vertical synch signal. It should be noted that when the polarity of the drive voltage $V_{LC}$ is inverted for every 1 line, this polarity inversion is controlled in accordance with the horizontal sync signal.

A operation will now be described. To display an image, the drive voltages are applied to the respective pixels where the row scan unit is intersected with the column scan unit, to change the light transmittance of the liquid crystal layer 6, so that desired brightness information is written. Differing from to the active matrix type liquid crystal display apparatus for utilizing the thin-film transistor as the switching element, the plasma-addressed liquid crystal display apparatus is not equipped with the electrodes on both sides of the liquid crystal display layer 6, and the glass thin plate 33 is in contact with one side of the liquid crystal display layer 6. As a consequence, the high drive voltage which is determined by taking account of the voltage dividing ratio of the liquid crystal capacitance to the glass thin-plate capacitance, is applied between the data electrode D and the lower surface R of the glass thin plate 3, which sandwich the liquid crystal layer 6, so that a desired effective value should be applied to the liquid crystal layer 6. When plasma discharge occurs between the anode electrode A and the cathode electrode K, a potential substantially equal to that of the anode electrode A appears at the lower surface R of the glass thin plate just after the discharge occurs, or during the discharge occurs. Therefore, when the drive voltage is applied between the liquid crystal layer 6 and the glass thin plate 3 via a signal source 12 connected between the data electrode D and the anode electrode A, a potential difference is produced between the data electrode D and the lower surface R only in a time period during which the anode potential appears at the under surface R of the glass thin plate. To the liquid crystal layer 6, the effective drive voltage is applied which is obtained by subdividing the potential difference between D and R based on the capacity ratio of the liquid crystal layer 6 to the glass thin plate 3. As a result, the light transmittance of the liquid crystal layer 6 may be controlled for every pixel. Unless electron charges leak from the liquid crystal layer 6 and the glass thin plate 3, the potential difference between the data electrode D and the lower surface R of the glass thin plate is maintained until the plasma discharge is produced in the next frame, and then the liquid crystal layer 6 continuously maintains the transmittance thereof.

Figure 7:
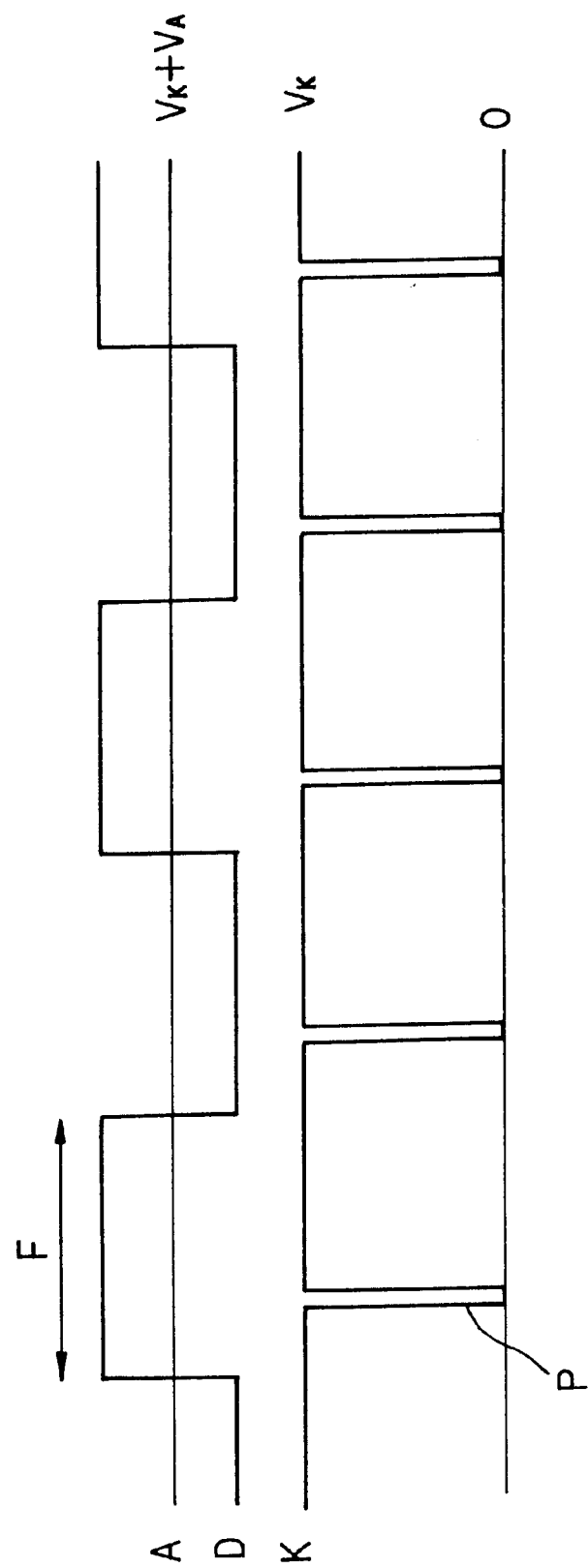
FIG. 7 is a waveform chart used to explain operations of the general example shown in FIG. 6.

FIG. 7 is a waveform chart for representing a general voltage waveform used to drive the above-described plasma-addressed liquid crystal display device. It should be noted that this driving method is of the frame inversion type. As shown in this drawing, a summed voltage between the output voltage $V_A$ of the first DC power source 9 and the output voltage $V_K$ of the second DC power source 10 is applied to the anode electrode A. For a better understanding, the anode potential (ground potential) is selected to be $V_K+V_A$ in this waveform chart. As a consequence, the zero potential level is under the ground potential. The drive voltage is applied to the data electrode D, whose polarity is inverted for every frame "F" with respect to the anode potential $V_K+V_A$. In the example shown in this figure, the drive voltage having the maximum amplitude is applied over all of the frame period in order to represent black color in the normally white mode. The strobe pulse P is applied to the cathode electrode K during each of the frame periods F in the row scan operation. For the sake of easy understanding, only one strobe pulse is represented. As apparent from this drawing, the strobe pulse P has the amplitude $V_K$.

Figure 8:
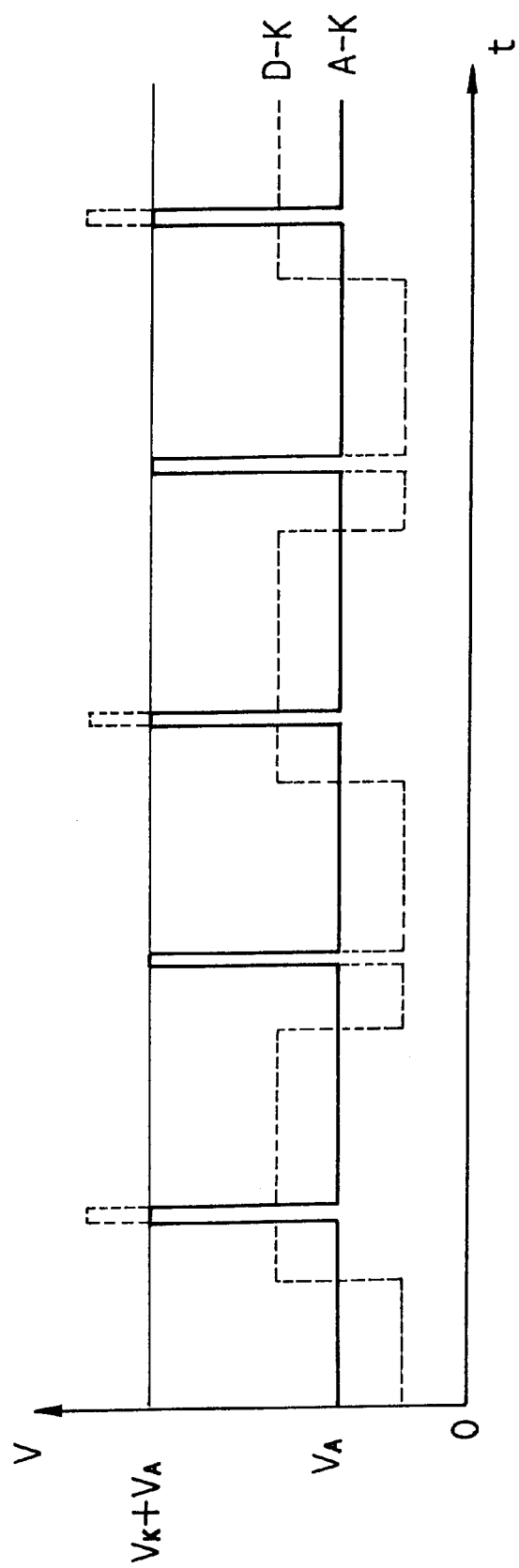
FIG. 8 is a waveform chart used to describe operations of the general example indicated in FIG. 6.

FIG. 8 is a timing chart for representing a potential difference between the data electrode D and the cathode electrode K, and also a potential difference between the anode electrode A and the cathode K in case that the general voltage waveforms shown in FIG. 7 are employed. As indicated by a solid line, a strobe pulse having an amplitude $V_K$ is applied between the anode electrode A and the cathode electrode K at each of the predetermined selection timings. On the other hand, a voltage pulse as illustrated by a dot line is applied between the data electrode D and the cathode electrode K in response to the selection timing. As apparent from the drawing, since the drive voltage $V_{LC}$ is added to this voltage pulse in the frame where the positive polarity drive is performed, the potential difference between the data electrode D and the cathode electrode K would become larger than the potential difference between the anode electrode A and the cathode electrode K. The potential at the data electrode D appears at the lower surface R of the glass thin plate through the liquid crystal capacity and the capacity of the glass thin plate just before the commencement of the plasma discharge. As a consequence, when the selection timing appears, plasma discharge is produced not between the anode electrode A and the cathode electrode K, but the lower surface R of the glass thin plate and the cathode electrode K, and at this time instant, the potential at the lower surface R is drawn to the cathode potential. As a result, as illustrated in FIG. 6, such a large potential difference obtained by adding ($V_K+V_A$) to the drive voltage $V_{LC}$ is produced between the data electrode D and the lower surface R of the glass thin plate, so that an excessive voltage would be applied to the liquid crystal layer, as compared with the normal voltage. As a result, a so-called "image retention" will occur in the liquid crystal, which cannot correctly display the image.

Figure 1:
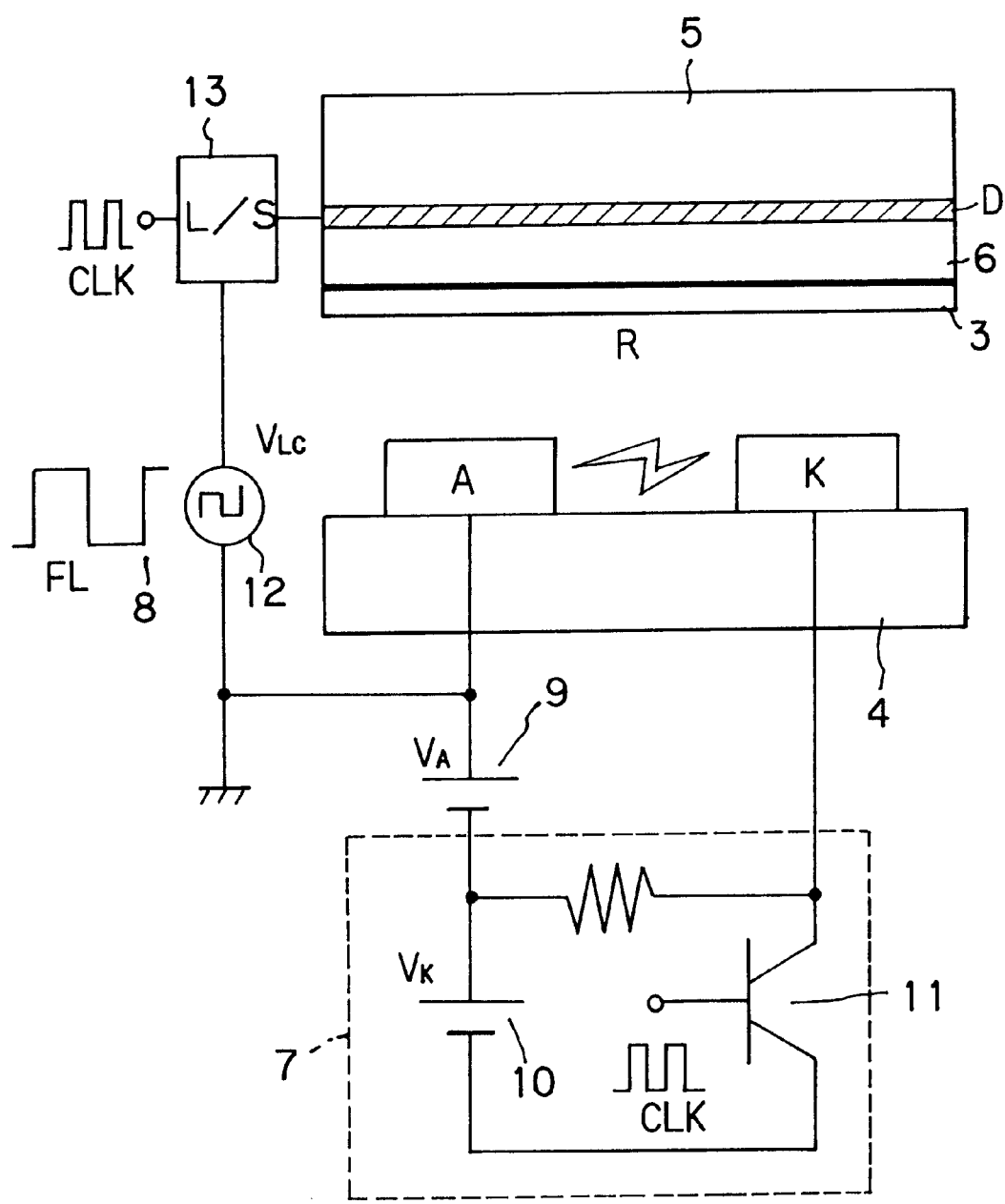
FIG. 1 schematically shows a structure of a plasma-addressed liquid crystal display device according to a first embodiment of the present invention.

FIG. 1 schematically shows a plasma-addressed liquid crystal display apparatus according to a first embodiment of the present invention. This plasma-addressed liquid crystal display device has basically the same structure as that of the general plasma-addressed liquid crystal display device as shown in FIG. 6. Therefore, the same reference numerals shown in FIG. 6 will be employed as those for denoting the corresponding portions for a better understanding. That is, the liquid crystal display device according to this embodiment has a flat panel structure such that a liquid crystal cell equipped with a column-shaped data electrode D, and a plasma cell equipped with a row-shaped discharge channel are mutually stacked on each other via an intermediate glass thin plate 3. A scanning circuit 7 is connected to the plasma cell so as to apply the strobe pulse to each of the discharge channels in the row scan operation. A driving circuit 8 is connected to the liquid crystal cell in order to apply the drive voltage $V_{LC}$ to the data electrode D in synchronism with this row scan operation. As a featured item of the present invention, this drive circuit 8 includes a control means for controlling the application of the drive voltage $V_{LC}$ in correspondence with the application timing of the strobe pulse, whereby an occurrence of unfavorable localized discharge can be suppressed. In accordance with the present embodiment, this control means is constructed of a level shifter (L/S) 13, and lowers the drive voltage $V_{LC}$ in a time period while the strobe pulse is being applied. The timing to lower the voltage is synchronized to the application timing of the strobe pulse, and both the level shifter 13 and the switching element 11 are controlled in response to the same clock signal CLK.

Figure 2:
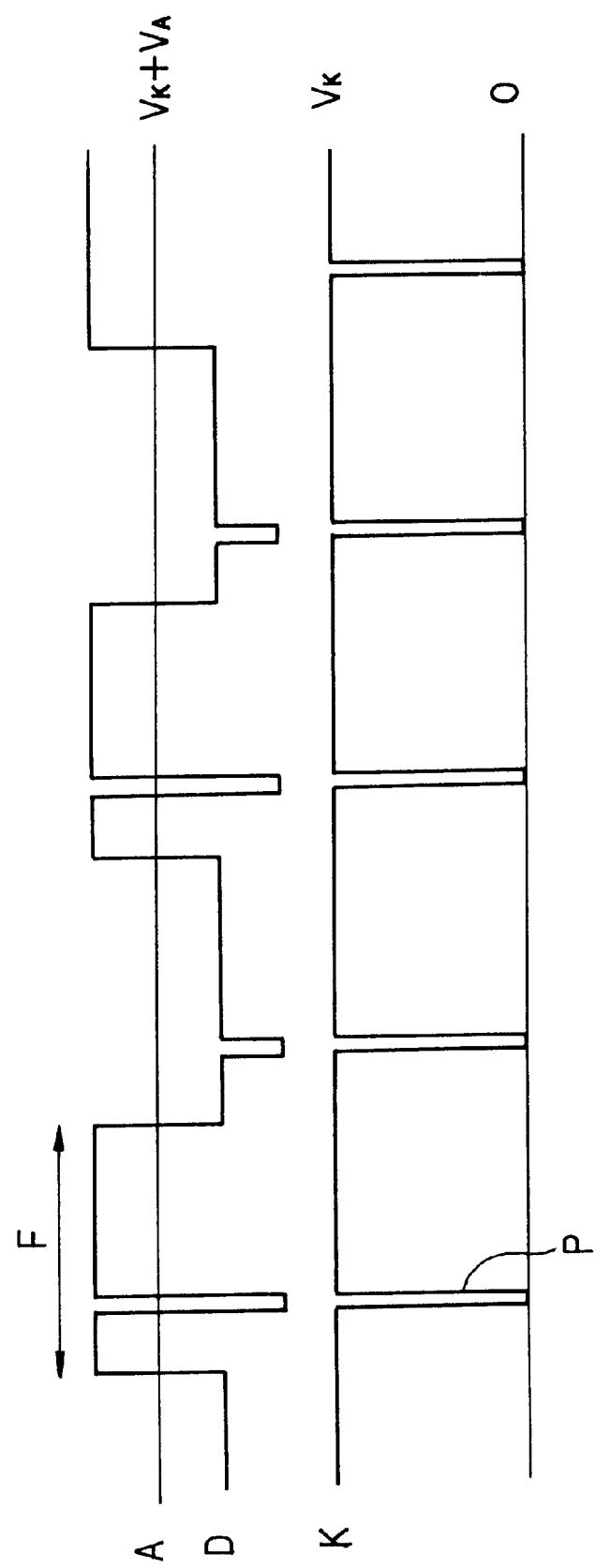
FIG. 2 is a waveform chart used to explain operations of the plasma-addressed liquid crystal display device according to the first embodiment.

FIG. 2 is a waveform chart used to explain an operation of the embodiment shown in FIG. 1, and shows waveforms of voltages applied to the anode electrode A, the cathode electrode K, and the data electrode D. A predetermined ground potential ($V_K+V_A$) is applied to the anode electrode A, and the strobe pulse "P" is applied to the cathode electrode K in the row scan operation. It should be noted that for the sake of a easy illustration, only one strobe pulse P is represented for every frame. It should also be noted that such a voltage control is carried out in such a manner that the drive voltage applied to the data electrode D is lowered during at least the selecting time period, whereby such a voltage higher than the voltage between the anode electrode A and the cathode electrode K is not applied between the lower surface R of the glass thin plate and the cathode electrode K. As a result, an occurrence of unfavorable localized discharge between the lower surface R and the cathode K can be suppressed, and normal discharge can be produced between the anode electrode A and the cathode electrode K. When the normal discharge is completed in this manner, the normal drive voltage is again applied to the data electrode D. Since the anode potential still remains at the lower surface R of the glass thin plate immediately after the plasma discharge, writing of the drive voltage into the liquid crystal layer is carried out just after the discharge. This written drive voltage is held during the frame period.

Figure 3:
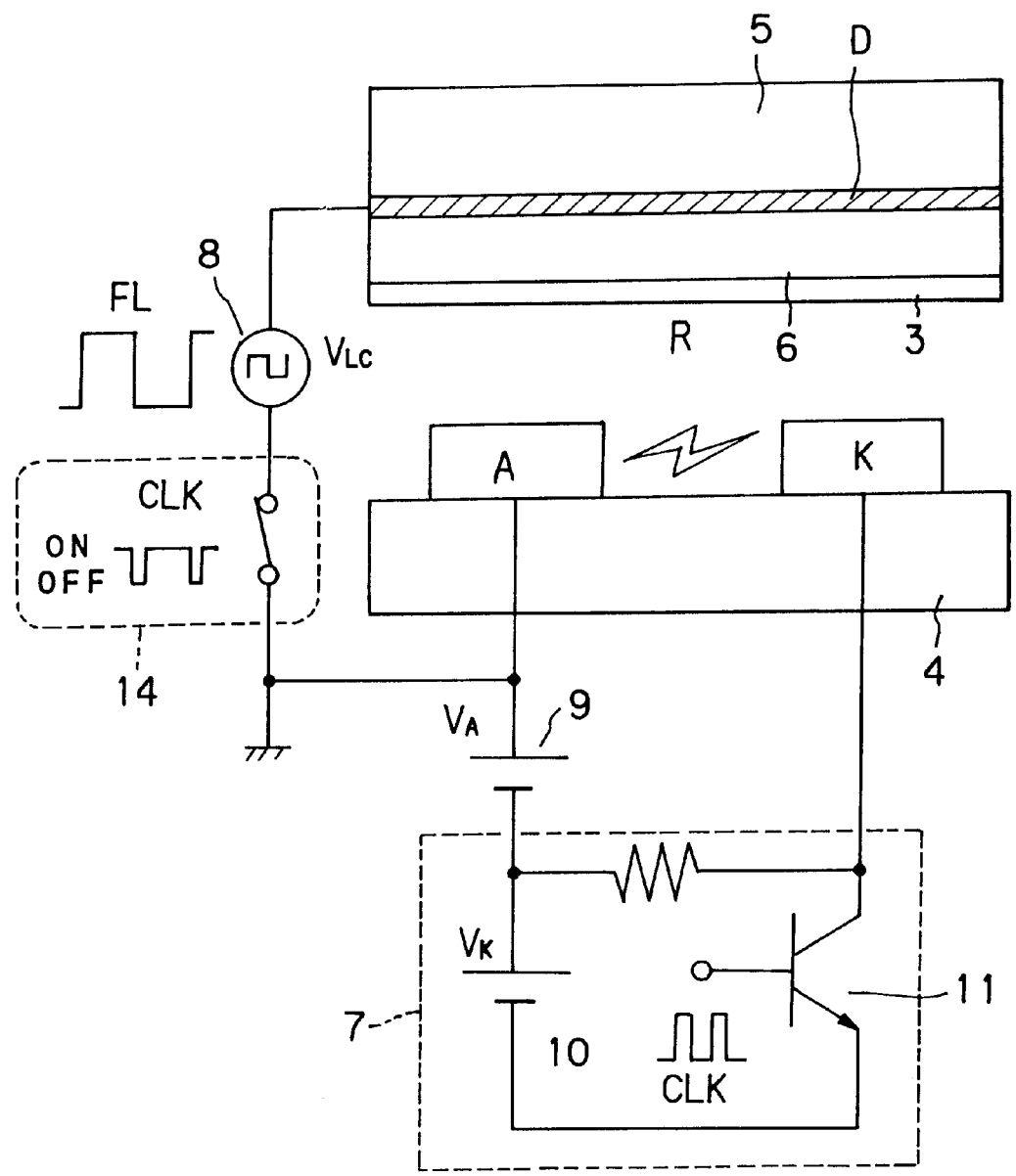
FIG. 3 schematically illustrates a structure of a plasma-addressed liquid crystal display device according to a second embodiment of the present invention.

FIG. 3 schematically indicates a plasma-addressed liquid crystal display device according to a second embodiment of the present invention. Basically, this plasma-addressed liquid crystal display device has the same structure as that of the first embodiment shown in FIG. 1. The same reference numerals as shown in FIG. 1 are employed as those for denoting the same, or similar elements in this drawing for a better understanding. A different point is such that the control means included in the drive circuit is arranged by a switch (SW) 14. This switch is to set the data electrode D to a floating potential in a time period during which the strobe pulse is being applied. Accordingly, a timing to open the switch SW is controlled in response to the inverted clock signal CLK. In synchronism with the selection timing of the cathode electrode K, the drive circuit 8 provided on the side of the liquid crystal cell is separated from the anode during the normal discharge. As a consequence, a potential at the lower surface R of the glass thin plate becomes irrelevant to the anode potential and the cathode potential, whereby the occurrence of the unfavorable localized discharge between the lower surface R of the glass thin plate and the cathode electrode K.

Figure 4:
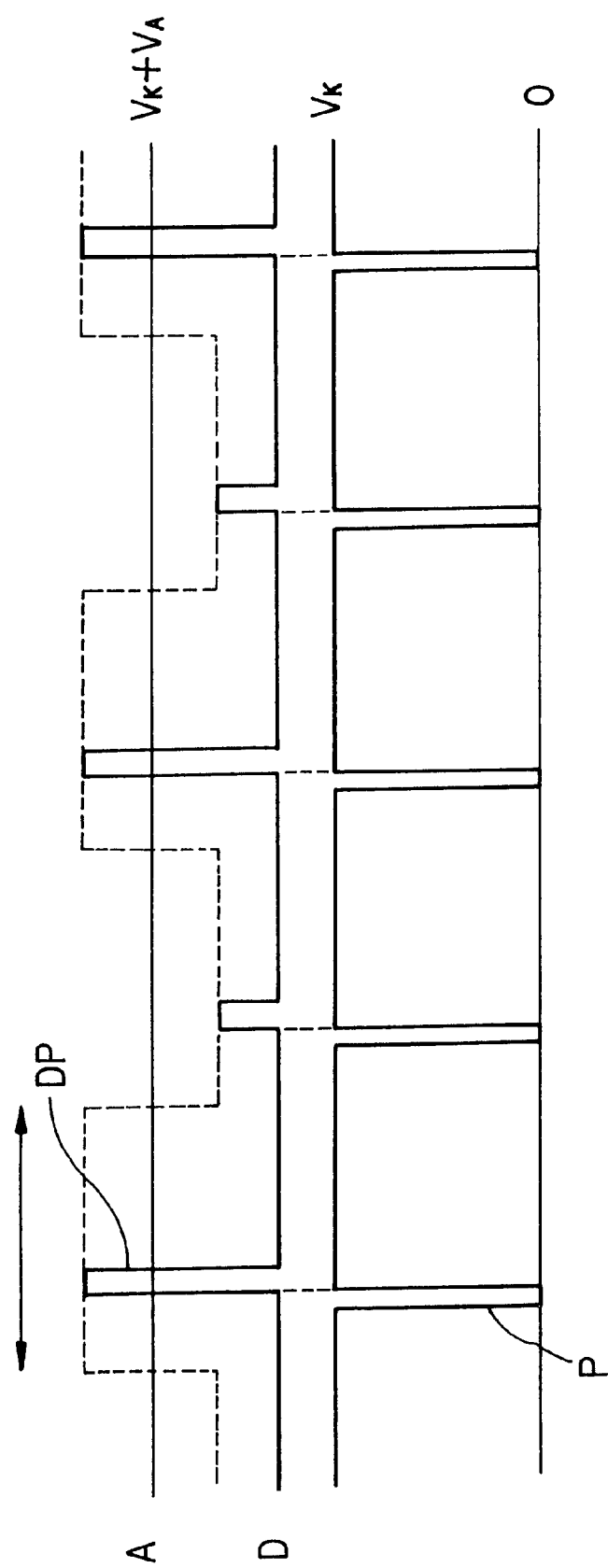
FIG. 4 is a waveform chart of a plasma-addressed liquid crystal display device according to a third embodiment of the present invention.

FIG. 4 is a waveform chart for showing a plasma-addressed liquid crystal display device according to a third embodiment of the present invention. In this embodiment, a control means of a drive circuit provided on the side of a liquid crystal cell is characterized by applying a drive voltage pulse DP just after an application of a strobe pulse P is completed. This drive voltage pulse DP has the same amplitude as that of the normal drive voltage as indicated by a dot line. During a time period other than the application timing of the drive voltage pulse DP, a voltage with a sufficiently low level to suppress the unfavorable localized discharge is applied to the data electrode D. In accordance with this embodiment, the drive voltage pulse DP is instantaneously applied to the data electrode D only immediately after the normal discharge at a timing as shown in FIG. 4 by utilizing such a fact that the anode potential remains at the lower surface R of the glass thin plate just after the normal discharge occurred between the anode electrode A and the cathode electrode K. Under such a control, the unfavorable localized discharge never occurs between the lower surface R of the glass thin plate and the cathode K, and also the normal discharge is produced between the anode A and the cathode K. The voltage applied between the data electrode D and the lower surface R of the glass thin plate immediately after the normal discharge is subdivided by the liquid crystal layer and the glass thin plate to obtain a predetermined effective voltage which will then be applied to the liquid crystal. The effective voltage which has been once written is kept without any change until the next selection timing. It should be understood that although the above-described embodiments are applied to the frame inverting drive mode, the present invention is not limited thereto, but may be applied to the line inverting drive mode.

As previously explained in detail, in accordance with the present invention, it is so controlled that no high voltage is applied to the data electrode of the liquid crystal cell in response to the timing at which the strobe pulse is applied to the cathode electrode. As a consequence, it is possible to suppress an occurrence of the unfavorable localized discharge from the cathode electrode to the lower surface of the glass thin plate, and also the normal discharge may be produced between the anode electrode and the cathode electrode. Therefore, the normal effective drive voltage is applied to the liquid crystal layer, so that there is such an advantage that the so-called "burning phenomenon" which occurred in prior art could be avoided.

Although other modifications and changes may be suggested by those skilled in the art, it is the intention of the inventor to embody within the patent warranted hereon all changes and modifications as reasonably and properly come within the scope of his contribution to the art.

What is claimed is:

1. A plasma-addressed liquid crystal display device, comprising:

a liquid crystal cell having a plurality of data electrodes therein;

a plasma cell associated with the liquid crystal cell and having a plurality of discharge channels with discharge electrodes, the liquid crystal cell and the plasma cell being disposed spaced-apart with the direction of the discharge channels transverse to that of the data electrodes and spaced from each other:

a scanning circuit operable to control an application of discharge pulses to said discharge electrodes in the discharge channels by a row scan operation; and a driving circuit provided to apply data voltages to the respective data electrodes, wherein said driving circuit includes means for substantially eliminating an increase in voltage between said discharge electrodes and said data electrodes during the application of the discharge pulse.

2. A plasma-addressed liquid crystal display device as claimed in claim 1, wherein said controlling means comprises means for lowering the data voltage in a time period of the application of the discharge pulse corresponding thereto.

3. A plasma-addressed liquid crystal display device as claimed in claim 1, wherein said controlling means comprises means for setting the data electrodes to a floating potential in a time period of the application of the discharge pulse corresponding thereto.

4. A plasma-addressed liquid crystal display device as claimed in claim 1, wyherein said controlling means comprises means for applying said data voltages just after the application of the discharge pulses is completed.

5. A plasma-addressed liquid crystal display device as claimed in claim 3, wherein said setting means comprises a switch means.

* * * * *